United States Patent
Seger et al.

(10) Patent No.: US 12,484,996 B2
(45) Date of Patent: Dec. 2, 2025

(54) MULTI-COLOURED BLANK FOR DENTAL PURPOSES

(71) Applicant: Ivoclar Vivadent AG, Schaan (LI)

(72) Inventors: Jürgen Seger, Vaduz (LI); Harald Bürke, Bardella (AT); Sebastian Krolikowski, Lachen (CH); Frank Rothbrust, Röns (AT)

(73) Assignee: Ivoclar Vivadent AG, Schaan (LI)

( * ) Notice: Subject to any disclaimer, the term of this patent is extended or adjusted under 35 U.S.C. 154(b) by 1298 days.

(21) Appl. No.: 17/251,046

(22) PCT Filed: Aug. 2, 2019

(86) PCT No.: PCT/EP2019/070891
§ 371 (c)(1),
(2) Date: Dec. 10, 2020

(87) PCT Pub. No.: WO2020/025795
PCT Pub. Date: Feb. 6, 2020

(65) Prior Publication Data
US 2021/0196437 A1    Jul. 1, 2021

(30) Foreign Application Priority Data
Aug. 2, 2018  (EP) .................................... 18187024

(51) Int. Cl.
*A61C 13/00* (2006.01)
*C03C 3/097* (2006.01)
*C03C 4/00* (2006.01)
*C03C 10/00* (2006.01)

(52) U.S. Cl.
CPC .......... *A61C 13/0022* (2013.01); *C03C 3/097* (2013.01); *C03C 4/0021* (2013.01); *C03C 10/0009* (2013.01); *C03C 10/0027* (2013.01); *A61C 2201/002* (2013.01)

(58) Field of Classification Search
None
See application file for complete search history.

(56) References Cited

U.S. PATENT DOCUMENTS

| | | |
|---|---|---|
| 6,379,593 B1 | 4/2002 | Datzmann et al. |
| 7,845,924 B2 | 12/2010 | Cadario et al. |
| 8,047,021 B2 | 11/2011 | Schweiger et al. |
| 8,940,402 B2 | 1/2015 | Giordano |
| 10,064,708 B2 | 9/2018 | Bürke et al. |
| 10,219,880 B2 | 3/2019 | Rolf et al. |
| 10,265,145 B2 | 4/2019 | Steger |
| 10,377,661 B2 | 8/2019 | Rampf et al. |

(Continued)

FOREIGN PATENT DOCUMENTS

| | | | |
|---|---|---|---|
| EP | 1688398 A1 | 8/2006 | |
| EP | 3528741 A1 * | 8/2019 | ......... A61C 13/0006 |

(Continued)

*Primary Examiner* — Elizabeth Collister
(74) *Attorney, Agent, or Firm* — Ann M. Knab; Thad McMurray (57) ABSTRACT

The present invention relates to a blank for dental purposes which has a first and a second layer which, independently of each other, are based on glass, glass-ceramic or ceramic, wherein the first layer and the second layer differ in colour and form a boundary surface, wherein the boundary surface runs obliquely.

16 Claims, 4 Drawing Sheets

(56) References Cited

U.S. PATENT DOCUMENTS

| | | |
|---|---|---|
| 10,583,480 B2 | 3/2020 | Menzel |
| 10,646,311 B2 | 5/2020 | Watzke et al. |
| 10,842,599 B2 | 11/2020 | Volkl et al. |
| 2002/0022563 A1 | 2/2002 | Schweiger et al. |
| 2003/0073563 A1 | 4/2003 | Brodkin et al. |
| 2007/0042889 A1 | 2/2007 | Apel et al. |
| 2009/0104584 A1 | 4/2009 | Ferrilli |
| 2011/0189636 A1 | 8/2011 | Thiel et al. |
| 2013/0221554 A1 | 8/2013 | Jung |
| 2013/0224454 A1 | 8/2013 | Jung |
| 2015/0282905 A1 | 10/2015 | Jahns et al. |
| 2016/0220337 A1* | 8/2016 | Steger ............... A61C 13/0022 |
| 2016/0262860 A1 | 9/2016 | Korten et al. |
| 2017/0056140 A1 | 3/2017 | Goto et al. |
| 2017/0088456 A1* | 3/2017 | Rampf ............... C03C 10/0027 |
| 2017/0273764 A1 | 9/2017 | Volkl et al. |
| 2017/0340420 A1 | 11/2017 | Bürke et al. |
| 2018/0179669 A1 | 6/2018 | Kawakami et al. |
| 2018/0318053 A1 | 11/2018 | Mormann et al. |
| 2019/0099244 A1 | 4/2019 | Vollmann et al. |
| 2019/0125503 A1 | 5/2019 | Krolikowski et al. |

FOREIGN PATENT DOCUMENTS

| | | |
|---|---|---|
| JP | 5662914 B2 | 2/2015 |
| WO | 02/09612 A1 | 2/2002 |

\* cited by examiner

MULTI-COLOURED BLANK FOR DENTAL PURPOSES

CROSS-REFERENCE TO RELATED APPLICATIONS

This application is a National Stage application of International patent application PCT/EP2019/070891 filed on Aug. 2, 2019, which claims priority to European patent application No. 18187024.7 filed on Aug. 2, 2018, the disclosures of which are incorporated herein by reference in their entirety.

TECHNICAL FIELD

The invention relates to a blank for dental purposes, with which the optical properties of natural tooth material can be very well imitated and which, due to its properties, is in particular suitable for the simple production of aesthetically demanding dental restorations with very good mechanical properties.

BACKGROUND

Creating blanks which meet the various requirements for use in the field of dental technology represents a major challenge. Such blanks should not only easy to be produced, but they should also be simple to be shaped to the desired geometry and still produce high-strength restorations. Finally, the blanks should already have a visual appearance which comes close to that of the natural tooth material, so that a subsequent complex veneering of the restoration can be dispensed with.

Creating blanks which meet the various requirements for use in the field of dental technology represents a major challenge. Such blanks should not only easy to be produced, but they should also be simple to be shaped to the desired geometry and still produce high-strength restorations. Finally, the blanks should already have a visual appearance which comes close to that of the natural tooth material, so that a subsequent complex veneering of the restoration can be dispensed with.

Multi-coloured blocks which simulate the gradient of the colour and the translucency from the dentine to the tooth enamel and their use in dental technology are known from the state of the art. For example, EP 0 870 479 A2 describes a process for the production of a multi-coloured shaped body for further processing into a dental restoration, in which at least two differently coloured starting materials in form of powder or granular material are filled into a press die and pressed to form a multi-coloured shaped body.

In the case of such shaped bodies, which are also referred to as sinter blocks because of their customary further processing by sintering, a colour gradient can be achieved rather simply, by introducing the differently coloured starting materials into the extrusion die one after the other. In order to imitate the colour and translucency gradient of a natural tooth as precisely as possible, it is however usually necessary to arrange more than two layers on top of each other. Furthermore, in the case of uniaxially pressed blocks, two or more layers can usually only be pressed on top of each other substantially horizontally. This has the further disadvantage that, in the case of discrete layers, their interface still remains visible in the final restoration. In order that the natural colour and translucency gradient can be reproduced, for the replacement of a posterior tooth, it is usually necessary to layer at least three layers on top of each other.

Basically, the following applies: the interface between the layers is the less recognizable, the more layers are layered on top of each other. In order to completely eliminate the transition between the individual layers, in the case of sinter blocks it is therefore generally necessary to make at least the transition from dentine to the incisal edge continuous. For this, however, complex filling devices are usually required, as described, for example, in WO 2013/067994 A1.

With the above-described process for the production of uniaxially pressed sinter blocks, posterior teeth can be imitated quite well. However, the reproduction of an anterior tooth is in general more difficult, as horizontally layered blocks are not built up like a natural anterior tooth, in which the translucent enamel layer lies substantially over the entire area of the tooth, in the cervical-incisal direction, over the more intensely coloured dentine core.

In addition to a substantially horizontal arrangement of the differently coloured layers, blocks are therefore also known in which the boundary surface between the differently coloured layers takes on a parabolic shape. For example, WO 2015/051095 A1 describes such a blank and the use thereof for the production of a dental prosthesis.

However, in the case of the known multi-coloured blocks of powder or granular-material layers, such as blocks of zirconium oxide, independently of the course of the boundary layer between individual layers after shaping for the dental restoration, a sintering step is still required in order to achieve the high strength that is essential for a dental restoration. However, this sintering is associated with significant shrinkage, which has to be taken into consideration by the use of enlarged moulds, which is complex. Fitting problems can thus occur as a result of the sintering process.

In order to avoid potential fitting problems, in addition to sinter blocks, glass and glass-ceramic blocks and the use thereof for the production of dental restorations are also generally known, which are produced by means of solid-glass technology, i.e. by melting suitable starting components, casting the melt in a suitable mould and then, optionally, heat treatment. In the case of these blocks, a sintering step after the shaping can be dispensed with. However, such glass-ceramic blocks, such as blocks of lithium silicate glass-ceramic, are usually monochrome, with the result that, when they are used by the dental technician in the anterior tooth region, a layering material has to be applied in order to imitate the colour gradient of a natural tooth as well as possible. The application of a layering material is a complex and cost-intensive process. In addition, the mechanical properties of the layering material, such as its strength, are as a rule lesser than those of the framework material, with the result that the layering material often represents the cause of the clinical failure of a dental restoration. A homogeneous, monolithic, high-strength glass-ceramic material, in which dentine regions and incisal regions differ exclusively in colour and translucency but otherwise consist of identical material, is therefore generally desirable.

Solid-glass blocks with differently coloured glass layers can certainly be produced in different ways. For example, WO 2014/124879 A1 describes a blank for dental purposes, which has two or more differently coloured layers of lithium silicate glass or lithium silicate glass-ceramic and can be obtained by applying a monolithic layer in the form of a melt onto another monolithic layer of a different colour. However, in order to achieve an apparently continuous colour and translucency gradient in the case of solid-glass blocks, it is generally necessary to join very many layers, such as eight layers or more, to each other.

In the case of the known multi-coloured blanks, the use of a plurality of differently coloured layers or even continuous colour gradients is therefore necessary in order to imitate the colour and translucency gradient of a natural tooth as faithfully as possible, and to avoid a visible boundary surface between individual layers. However, the provision of a plurality of differently coloured layers is complex and seldom economical, in particular in the case of blocks which have been produced via solid-glass technology. In the case of multi-coloured blanks made of powder or granular-material layers, so-called sinter blocks, there is a further problem in that the necessary sintering can lead to fitting problems after the shaping of the dental restoration. The dental restorations produced from sinter blocks also generally have a lower strength.

SUMMARY

According to the invention the above-mentioned problems are to be avoided. The object of the invention is in particular to provide a blank which is simple to produce, with which the visual appearance of natural tooth material can be very well imitated, to which the shape of the desired dental restoration can be given in a simple manner by machining and which, after shaping, can be converted without substantial shrinkage into a precise and high-strength dental restoration, in which no boundary surface is visible between different layers.

This object is achieved by the blank according to the claims. A subject of the invention is also the process for the production of the blank, the process for the production of dental restorations as well as the use of the blank.

BRIEF DESCRIPTION OF THE DRAWINGS

The invention is described below on the basis of an illustrative embodiment in the drawings, in which.

DETAILED DESCRIPTION

The blank for dental purposes according to the invention is characterized in that it has a first and a second layer which, independently of each other, are based on
   glass,
   glass-ceramic or
   ceramic,
wherein the first layer and the second layer differ in colour and form a boundary surface, wherein the boundary surface runs obliquely.

In the above connection, the term "based on" means that the first and the second layer of the blank, relative to the mass of the total of all the constituents of the layer, contain predominantly glass, glass-ceramic or ceramic. It is preferred that the first and the second layer, independently of each other, consist of glass, glass-ceramic or ceramic.

Both the first and the second layer are preferably both based on glass, both based on glass-ceramic or both based on ceramic. It is furthermore preferred that both the first and the second layer both consist of glass, both of glass-ceramic or both of ceramic.

By "differences in the colour" are meant differences in the colour shade in the narrower sense and/or differences in the translucency, opalescence or fluorescence. The term "translucency" describes the light transmission. The colour can in particular be characterized by its Lab value or by a shade guide customary in the dental industry. Furthermore, it is not necessary for the differences in the colour of the first and second layer in the blank to be recognizable with the human eye. Rather, a difference in the colour shade and/or the translucency may become visible only after a sintering step or a heat treatment.

The blank according to the invention is thus, in particular, characterized in that a desired colour gradient is already produced with only two differently coloured layers, with the result that the colour and translucency gradient of natural teeth, in particular anterior teeth, can be imitated without the boundary surface between the layers remaining visible in the subsequent dental prosthesis. This is surprisingly achieved in that, unlike in the case of uniaxially pressed sinter blocks, the boundary surface between the first and second layer not run horizontally, but rather obliquely. It is thereby possible to arrange a more translucent layer, which is meant to imitate the incisal layer, obliquely above a more opaque and more strongly coloured layer, which is meant to imitate the dentine layer, with the result that the colour gradient of a natural tooth, in particular anterior tooth, can be imitated and the transition appears continuous, without a disruptive boundary line between the layers becoming recognizable.

The presence of further layers is not excluded according to the invention. However, the fewer layers the blank comprises, the less the preparatory effort for the production of the blanks. It is thus preferred that the blank according to the invention has no further layers in addition to the first and the second layer.

Preferably, the volume areas formed by the first and the second layer are non-concentric. This means that these volume areas of the blank do not have the same centroid.

It is further preferred that, in a first sectional plane through the blank, which runs parallel to the insertion axis of the blank, the boundary surface between the first and second layer does not run perpendicular to the insertion axis.

The term "insertion axis of the blank" refers to the axis in the cervical-incisal direction and describes, in particular for the case where a crown is to be produced from the blank, the insertion direction of the dental prosthesis to be produced from the blank to a model. In general, the insertion axis of the blank thus substantially coincides with the tooth longitudinal axis of the dental prosthesis to be produced therefrom. Thus, the insertion axis refers to the respective patients' situation. In the case of a blank in the form of a block or cuboid, the insertion axis preferably represents the straight line which passes through the centres of gravity of two opposite side surfaces of the blank, in particular of two side surfaces that are opposite in the cervical-incisal direction. In the case of a blank in the form of a disc or of a cylinder, the insertion axis preferably runs perpendicular to the disc surface. If the blank has a holder for a processing device, such as a holder for a CAD/CAM device, according to an embodiment, the insertion axis of the blank—as further described below—preferably runs perpendicular to the rotation axis of the holder.

In particular, it is preferred that the boundary surface in the first sectional plane runs substantially straight. Therefore, in a preferred embodiment, the blank according to the invention is characterized in that the boundary surface of the first and second layer in the first sectional plane runs substantially straight and is at an angle different from 90° to the insertion axis.

A blank in which the boundary surface of the first and second layer in the first sectional plane is at an angle of from 20 to 80°, preferably 30 to 80° to the insertion axis is particularly preferred. In the case of such a course of the boundary surface, the natural colour gradient of an anterior tooth can be imitated particularly well.

In another embodiment, the boundary surface of the first and second layer in the first sectional plane runs arcuately. In this embodiment also, it is preferred that the boundary surface of the first and second layer in the first sectional plane is at an angle different from 90° to the insertion axis of the blank. Particularly preferably, the line of best fit through the line of the boundary surface in the first sectional plane is at an angle of from 20 to 80°, preferably 30 to 80° to the insertion axis of the blank, in order to be able to imitate the colour gradient of an anterior tooth particularly well.

Irrespective of whether the boundary surface of the first and second layer in the first sectional plane runs substantially straight or arcuately, the blank has a first and second region, wherein the first region is situated on one side of the boundary surface, e.g. above the boundary surface, and serves to imitate the incisal edge of a tooth in the dental restoration to be produced from the blank, and the second region is situated on the opposite side of the boundary surface, e.g. below the boundary surface, and serves to imitate the dentine of a tooth in the dental restoration to be produced from the blank.

Furthermore, it is preferred that the rotation axis of the blank runs substantially perpendicular to the insertion axis of the blank. Particularly preferably, the angle between the rotation axis and the insertion axis in the first sectional plane is 90°. In a further embodiment, the angle between the rotation axis and the insertion axis in the first sectional plane is preferably from 70 to 110°, in particular 80 to 100° and particularly preferably about 90°. The term "rotation axis of the blank" refers to the axis about which the blank is rotated during the machining for shaping the desired dental restoration. If the blank has e.g. a holder for a CAD/CAM device, the rotation axis of the blank coincides with the rotation axis of the holder.

Therefore, a blank is preferred in which the boundary surface of the first and the second layer in the first sectional plane is at an angle of from 10 to 70°, preferably 10 to 60° to the rotation axis. It has been found that such an angle between the boundary surface of the first and second layer and the rotation axis leads to more degrees of freedom in the design of the dental restoration and its placing in the blank, with the result that a complex 5-axis machining of the blank can be avoided.

Furthermore, it is preferred that the boundary surface of the first and second layer runs arcuately and in particular runs convexly curved through the blank in a second sectional plane which runs perpendicular to the first sectional plane. The term "convexly curved" relates to the layer which has a lower translucency and thus is intended to imitate the dentine layer of the tooth to be replaced. This means that the less translucent layer is curved "outwards" in the second sectional plane, i.e. in the direction of the layer with higher translucency. This course of the boundary surface between first and second layer also leads to the natural colour gradient of an anterior tooth being able to be imitated particularly well. In particular, during the reproduction of an anterior tooth crown, the convex curvature in relation to the dentine layer leads to an apparently continuous transition between dentine and incisal edge being made possible, not only incisally but also mesially and distally.

In the case of natural anterior teeth, the dentine in the incisal region runs out in a mamelon structure. In order to imitate anterior teeth particularly faithfully, it is therefore preferred that, in the case of the blank according to the invention, the boundary surface of the first and second layer in the second sectional plane has a mamelon structure. The term "mamelon" refers to small protuberances or humps. Therefore the mamelon structure has indentations. In particular, it is advantageous that the mamelons run out in the cervical direction. Furthermore, it is advantageous that the mamelons taper in incisal direction. According to a preferred embodiment, in the second sectional plane, the boundary surface thus preferably has a plurality of indentations starting from its generally convexly curved course. Preferably, the indentations differ from each other in their width and depth, with the result that an irregular mamelon structure is preferably present. Furthermore, the mamelon structure is preferably designed such that the depth of the indentations is up to 2 mm, preferably from 0.1 to 0.5 mm. In an embodiment, the depth of one or all of the indentations of the mamelon structure is not constant, but decreases along an extent of the boundary surface running perpendicular to the second sectional plane. If the blank according to the invention is used for the manufacture of a crown for restoration of an anterior tooth, the boundary surface will preferably have two or three mamelons.

Furthermore, a blank is preferred in which the first layer has a refractive index which differs from the refractive index of the second layer by not more than 0.1. This embodiment has the particular advantage that no disruptive boundary surface between the layers is visually perceptible. The refractive index can be determined by the immersion method with refractive index liquids or by a so-called Abbe refractometer. In the case of blanks based on lithium silicate glass-ceramic, the above preferred difference between the refractive indices of the first and second layer relates to the lithium disilicate state, i.e. after the heat treatment for forming lithium disilicate the refractive index of the first layer differs from the refractive index of the second lithium disilicate layer by not more than 0.1. As known by person skilled in the art, the refractive index of a glass or glass-ceramic depends on its chemical composition and/or the crystal phases that may be present. For example, an increase in the proportion of $SiO_2$ in glasses based on $SiO_2/CaO/MgO/Na_2O/Al_2O_3/K_2O$ leads to a decrease in the refractive index.

Moreover, it is preferred that the blank according to the invention has a mark which is recognized by a CAD/CAM device and with which the position of the boundary surface of the first and second layer can be determined with an accuracy of in particular 0.1 mm. The design of such a mark can be chosen freely. For example, the mark can be applied to an edge or a side surface of the blank in the form of a notch or projection. According to an embodiment, the mark represents a notch which is applied directly to the boundary surface of the first and the second layer. Alternatively, the notch can also be arranged spaced apart from the boundary surface. In this connection, the reproducibility of the distance of the notch from the boundary surface is important, so that e.g. the CAD/CAM unit places the restoration at the correct distance from the boundary surface, in order to achieve the desired proportion of dentine and incisal layer. During machining of the blank, marks in the form of a notch can be recognized by a tactile process. In the case of a mark in the form of an imprint or a colour mark, the mark can be captured by a camera or a scanner. The description of the position of the boundary surface between the first and the second layer in relation to the mark can also be integrated in a QR code or data matrix code to be scanned. The CAD/CAM unit can calculate the optimum position of the restoration in the blank. Alternatively, with the aid of the CAD software, the user can also manually move the position of the restoration into the desired region of the blank, in particular when the course of the layer in the blank is represented in the CAD software.

In a particularly preferred embodiment, the blank according to the invention has a combination of two or more of the above-mentioned, preferred features. In particular, the blank is characterized in that the boundary surface of the first and second layer in the first sectional plane runs substantially straight or arcuately and is at an angle different from 90° to the insertion axis, wherein the angle of the boundary surface or the line of best fit through the course of the boundary surface in the first sectional plane to the insertion axis in the first sectional plane is from 20 to 80°, preferably 30 to 80°;

the rotation axis of the blank in the first sectional plane runs substantially perpendicular to the insertion axis, wherein the angle between the rotation axis and the insertion axis in the first sectional plane is preferably from 70 to 110°, in particular 80 to 100° and particularly preferably 90°;

the boundary surface of the first and second layer in the first sectional plane runs substantially straight or arcuately and is at an angle different from 90° to the rotation axis, wherein the angle of the boundary surface or the line of best fit through the course of the boundary surface in the first sectional plane to the rotation axis in the first sectional plane is from 10 to 70°, preferably 10 to 60°;

the boundary surface of the first and second layer runs arcuately and in particular runs convexly curved through the blank in a second sectional plane which runs perpendicular to the first sectional plane;

the boundary surface of the first and second layer in the second sectional plane has a mamelon structure, wherein the mamelon structure is preferably designed such that the depth of the indentations of the mamelon structure, at least in a part of the boundary surface, is up to 2 mm, preferably from 0.1 to 0.5 mm;

the first layer has a refractive index which differs from the refractive index of the second layer by not more than 0.1; and the blank according to the invention has a mark which is recognized by a CAD/CAM device and with which the position of the boundary surface of the first and second layer can be determined with an accuracy of in particular 0.1 mm.

Figure 1:
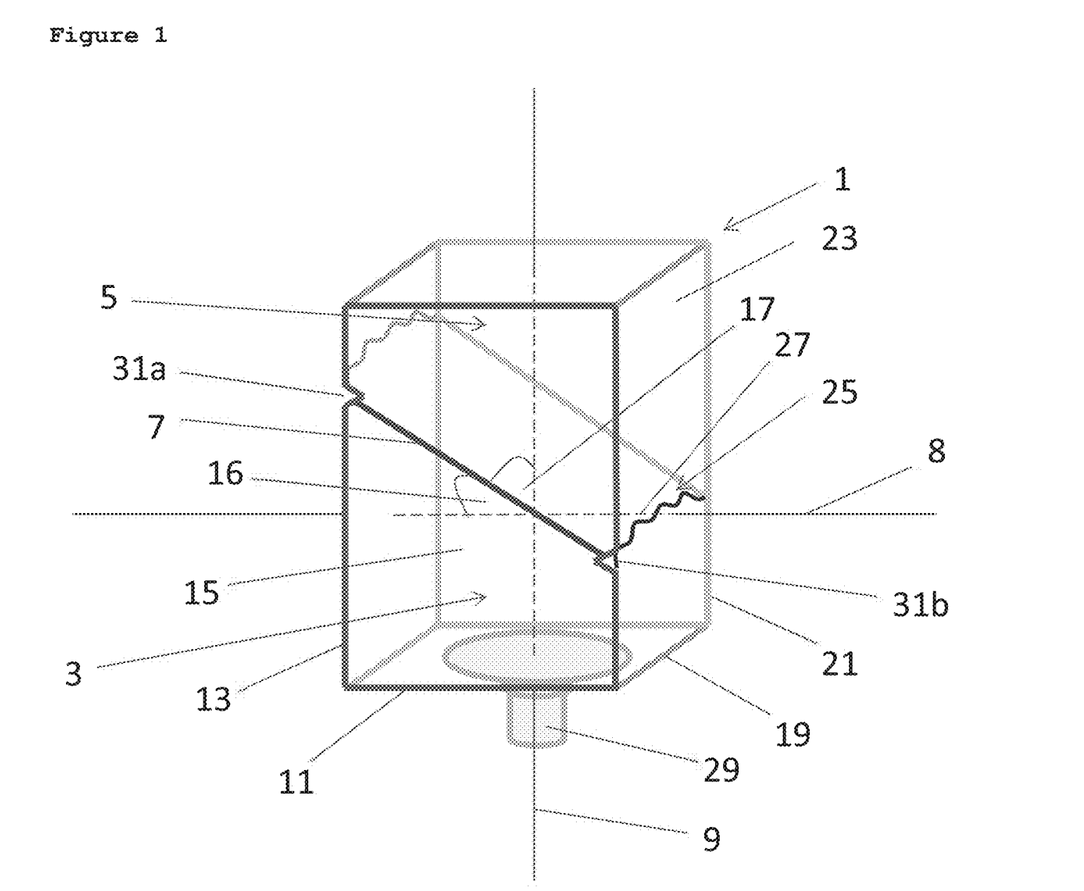
FIG. 1 shows a schematic view of a multi-coloured blank according to the invention.

For example, FIG. 1 shows a schematic view of a multi-coloured blank 1 according to the invention, which has a first layer 3 and a second layer 5 which differ in colour and form a boundary surface 7. The boundary surface 7 runs in a first sectional plane, which runs parallel to the insertion axis 8 and in FIG. 1 is represented as side surface 15 of the blank, formed by edges 11 and 13, at an angle 16 to the insertion axis 8. The insertion axis 8 in the first sectional plane 15 runs perpendicular to the rotation axis 9 of the blank. The boundary surface 7 in the first sectional plane 15 runs at an angle 17 to the rotation axis 9. In a second sectional plane, which is represented in FIG. 1 by the side surface 23 formed by edges 19 and 21, the boundary surface 7 runs convexly curved and has a mamelon structure 25 with indentations 27. The blank 1 further has a holder 29 for the fixing in a CAD/CAM device, as well as marks 31a and 31b, which can be recognized by a CAD/CAM device, with the result that the course of the boundary surface 7 can be recognized by the CAD/CAM device.

Figure 2:
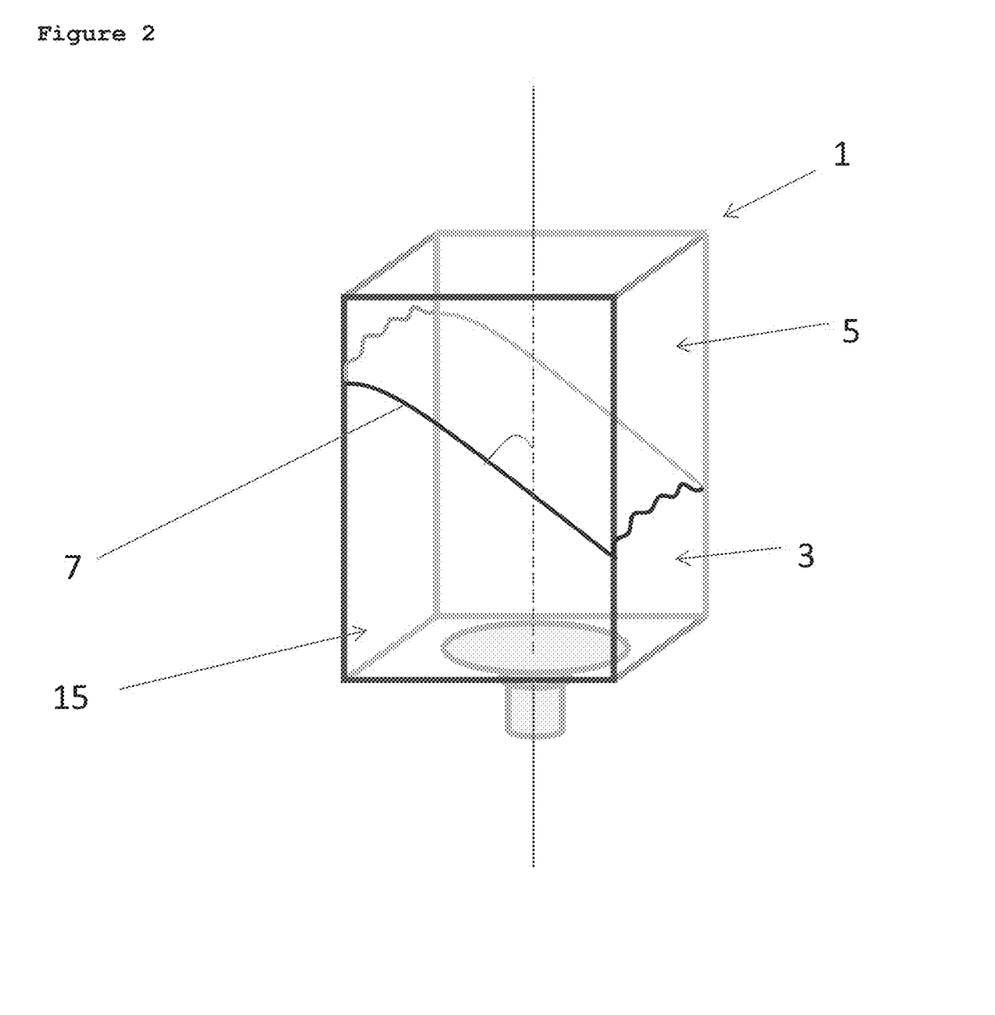
FIG. 2 shows a schematic view according to a further embodiment of a multi-coloured blank.

FIG. 2 shows a schematic view according to a further embodiment of a multi-coloured blank 1, in which the boundary surface 7 between the first layer 3 and the second layer 5 in the sectional plane 15 does not run completely straight, but at least partially arcuately.

Figure 3:
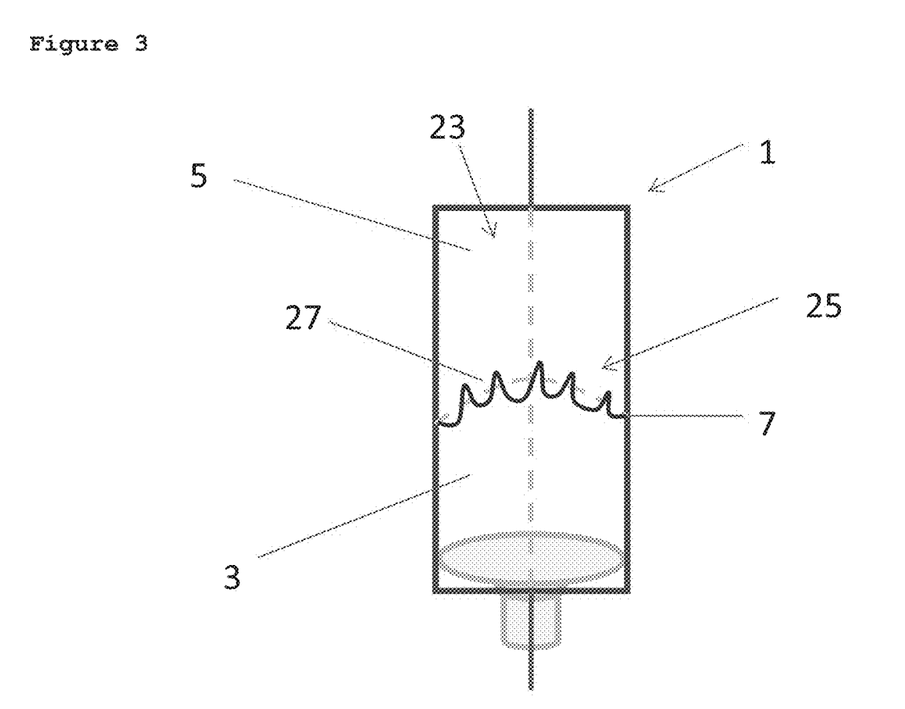
FIG. 3 shows a cross-section through a multi-coloured blank.

FIG. 3 shows a cross-section through the multi-coloured blank 1 according to FIG. 1 in the second sectional plane 23. The generally convexly curved course of the boundary surface 7 between the first layer 3 and the second layer 5 can be seen. This arcuate course is superimposed by the mamelon structure 25 with individual indentations 27.

Figure 4:
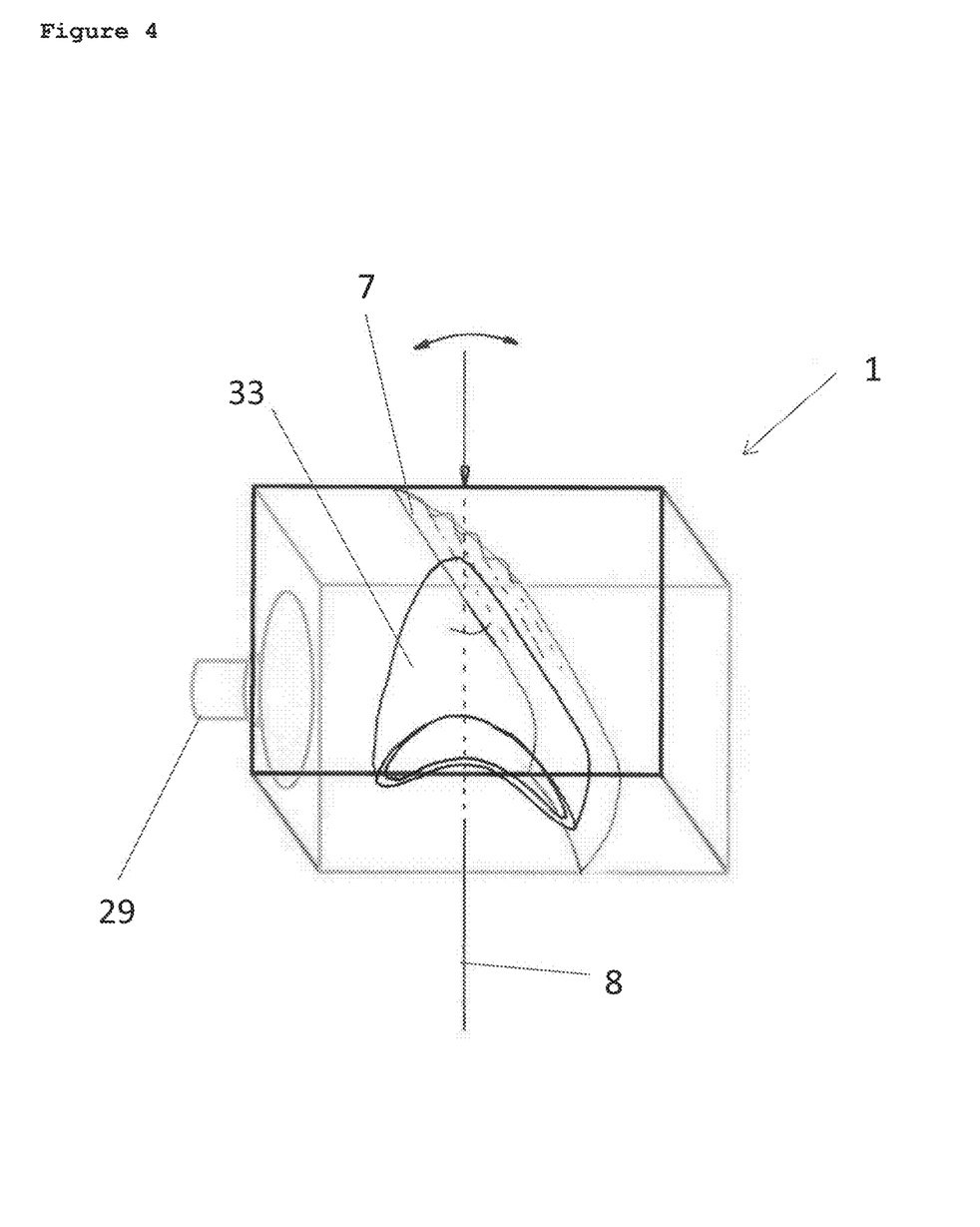
FIG. 4 shows a schematic view of a further embodiment of the blank.

FIG. 4 shows a schematic view of a further embodiment of the blank 1 according to the invention, in which the insertion axis 8 runs perpendicular to the rotation axis of the holder 29. Moreover, the position of the dental restoration 33 to be produced from the blank 1 is represented in the blank 1, wherein one part of the restoration 33, namely the part which is meant to imitate the incisal edge in an anterior region of the restoration 33, lies above the boundary surface 7, and another part of the restoration 33, namely the part which is primarily meant to imitate the dentine layer, lies below the boundary surface 7.

In a further embodiment, the boundary surface can be designed with colour effects. A subsequent colouring of the dental restoration to be produced from the blank can thereby be avoided. The colour effect can, for example, imitate an enamel crack, an enamel spot or another characterization. Such colour effects can be realized during the production of the blank, in that they are applied to the first layer before the second layer is applied to the first layer. 3D powder printing processes are also suitable for realizing the colour effects, wherein the effect is printed onto the blank which is then sintered.

With regard to the material of the blank according to the invention, it is preferred that the glass, the glass-ceramic or the ceramic are selected from lithium silicate glass, lithium silicate glass-ceramic, silicon dioxide glass, silicon dioxide glass-ceramic and/or zirconium oxide.

According to a first aspect, it is preferred that the layers of the blank according to the invention are based on lithium silicate glass, lithium silicate glass with nuclei or lithium metasilicate glass-ceramic, r consist thereof. Due to its relatively low strength, the shape of the desired dental restoration can be given to such a blank particularly simply by machining. According to an alternative embodiment, the layers of the blank according to the invention are based on lithium disilicate glass-ceramic.

Particularly preferably, the lithium silicate glass, the lithium silicate glass with nuclei, the lithium metasilicate glass-ceramic or the lithium disilicate glass-ceramic contain at least one and preferably all of the following components in the amounts indicated, wherein the amounts of the components are calculated as oxides, as is usual in the case of glasses and glass-ceramics:

| Component | wt.-% |
|---|---|
| SiO$_2$ | 64.0 to 73.0 |
| Li$_2$O | 12.0 to 18.0 |

-continued

| Component | wt.-% |
| --- | --- |
| $K_2O$ | 1.0 to 5.0 |
| $Al_2O_3$ | 0.5 to 5.0 |
| $P_2O_5$ | 1.0 to 7.0. |

Furthermore, the lithium silicate glass, the lithium silicate glass with nuclei, the lithium metasilicate glass-ceramic or the lithium disilicate glass-ceramic preferably contain at least one and in particular all of the following components in the amounts indicated:

| Component | wt.-% |
| --- | --- |
| $ZrO_2$ | 0 to 1.0, such as about 0.1 |
| ZnO | 0 to 6.0 |
| $Na_2O$ | 0 to 2.0 |
| $Me^{II}O$ | 0 to 5.0, | wherein $Me^{II}O$ is a divalent oxide which is selected in particular from MgO, Cao and/or SrO.

Further preferred compositions for a lithium silicate glass, a lithium silicate glass with nuclei, a lithium metasilicate glass-ceramic or a lithium disilicate glass-ceramic are described in EP 1 505 041 A1 and EP 1 688 398 A1.

In particular, such compositions are preferred in which the amount of oxides of elements with an atomic number of 19 or higher in the first layer differs by not more than 2 wt.-%, preferably not more than 1.5 wt.-%, from the amount of oxides of elements with an atomic number of 19 or higher in the second layer.

It has surprisingly been found that it is possible, through the above-mentioned preferred compositions and in particular through the above-mentioned preferred condition with regard to the amount of oxides with an atomic number of 19 or greater, to provide a first and second layer which, despite their different colour have almost identical refractive indices. In this way it is possible to provide a blank and subsequently also a dental prosthesis in which no disruptive boundary surface between layers is visible.

The lithium silicate glass is usually produced by melting suitable starting substances. This glass can be converted into the lithium silicate glass with nuclei by heat treatment. The nuclei are those which are suitable for the crystallization of lithium metasilicate and/or lithium disilicate. The lithium silicate glass with nuclei can be converted to the lithium metasilicate glass-ceramic by heat treatment.

Finally it is possible to convert the lithium metasilicate glass-ceramic into high-strength lithium disilicate glass-ceramic by further heat treatment. The lithium silicate glass, the lithium silicate glass with nuclei and the lithium metasilicate glass-ceramic are therefore precursors of the lithium disilicate glass-ceramic.

A blank is further preferred in which the lithium metasilicate glass-ceramic contains lithium metasilicate as main crystal phase and in particular contains more than 5 vol.-%, preferably more than 10 vol.-% and particularly preferably more than 20 vol.-% lithium metasilicate crystals. The term "main crystal phase" refers to the crystal phase which has the highest proportion by volume compared with other crystal phases.

In a further embodiment, a blank based on a glass-ceramic is preferred which, in addition to a lithium silicate crystal phase, in particular a lithium metasilicate or lithium disilicate crystal phase, contains a further crystal phase, preferably an $SiO_2$ crystal phase, such as low quartz. Particularly preferably, such a blank contains at least one and preferably all of the following components in the amounts indicated:

| Component | wt.-% |
| --- | --- |
| $SiO_2$ | 59.0 to 79.0, or 68.0 to 79.0 |
| $Li_2O$ | 8.0 to 15.0 |
| $P_2O_5$ | 0 to 9.0 |
| $Me^{I}_2O$ | 1.0 to 8.0 |
| $Me^{II}O$ | 1.0 to 9.0 |
| $Me^{III}_2O_3$ | 1.0 to 8.0, | wherein $Me^{I}_2O$ is selected from the group of $K_2O$, $Na_2O$, $Rb_2O$, $CS_2O$ and mixtures thereof, $Me^{II}O$ is selected from the group of Cao, MgO, Sro, Zno and mixtures thereof and $Me^{III}_2O_3$ is selected from the group of $Al_2O_3$, $B_2O_3$, $Y_2O_3$, $La_2O_3$, $Ga_2O_3$, $In_2O_3$ and mixtures thereof.

In the case of such glass-ceramics, the molar ratio of $SiO_2$ to $Li_2O$ is preferably in the range of from 2.2 to 3.8. Furthermore, it is preferred that the lithium disilicate content in the glass-ceramic is more than 20 wt.-%, preferably 25 to 55 wt.-%. It is also preferred that the low quartz content is 0.2 to 28 wt.-%. Further preferred glass-ceramics which contain a low quartz crystal phase in addition to a lithium silicate crystal phase are described in EP 3 315 641.

In a preferred embodiment, the blank according to the invention has monolithic layers of lithium silicate glass, monolithic layers of lithium silicate glass with nuclei, monolithic layers of lithium metasilicate glass-ceramic or monolithic layers of lithium disilicate glass-ceramic.

The term "monolithic" refers to layers which are continuous and thus differ from discontinuous layers such as layers of particles, e.g. powder or granular-material layers. The monolithic layers used according to the invention can also be referred to as solid layers of the glasses and glass-ceramics.

The presence of monolithic layers in the blank according to the first aspect of the invention is also responsible for the fact that its conversion to the desired high-strength dental restoration is possible by heat treatment without substantial shrinkage. By contrast, the discontinuous layers present in the case of conventional blanks, such as pressed layers of powders or granular materials, still have to be densely sintered in order to produce the final dental restoration. However, this dense sintering leads to substantial shrinkage. In order to produce accurately fitting dental restorations, an enlarged form of the restoration must therefore be produced first and this enlarged form is then densely sintered. Such a procedure is, however, complex and prone to failure. It also first requires the precise determination of the enlargement factor to be selected in each case, which depends on the precise sintering conditions and the type of blank used, among other things.

According to a second aspect, it is preferred that the layers of the blank according to the invention are based on silicon dioxide glass, silicon dioxide glass with nuclei or silicon dioxide glass-ceramic, or consist thereof. In particular a blank in which the layers are based on silicon dioxide glass-ceramic or consist thereof is preferred. The shape of the desired dental restoration can be given to such a blank, even in a completely crystallized form, relatively simply by machining. A heat treatment after the machining is no longer necessary in this case, whereby such a blank is particularly advantageous.

Particularly preferably, the silicon dioxide glass, the silicon dioxide glass with nuclei or the silicon dioxide glass-ceramic contain at least one and preferably all of the following components in the amounts indicated:

| Component | wt.-% |
|---|---|
| $SiO_2$ | 58.0 to 92.0 |
| $Li_2O$ | 2.0 to 10.0 |
| $Me^I_2O$ | 0 to 13.0 |
| $Me^{II}O$ | 0 to 11.0 |
| $Me^{III}_2O_3$ | 0 to 10.0 |
| $Me^{IV}O_2$ | 0 to 21.0 |
| $P_2O_5$ | 0 to 7.0 |
| $Me^V_2O_5$ | 0 to 6.0 |
| $Me^{VI}O_3$ | 0 to 6.0 |
| Fluorine | 0 to 5.0, | wherein $Me^I_2O$ is selected in particular from $Na_2O$, $K_2O$, $Rb_2O$ and/or $CS_2O$; $Me^{II}O$ is selected in particular from MgO, Cao, Sro and/or Zno; $Me^{III}_2O_3$ is selected in particular from $Al_2O_3$, $B_2O_3$, $Y_2O_3$, $La_2O_3$, $Ga_2O_3$ and/or $In_2O_3$; $Me^{IV}O_2$ is selected in particular from $ZrO_2$, $GeO_2$, $CeO_2$, $TiO_2$ and/or $SnO_2$; $Me^V_2O_5$ is selected in particular from $V_2O_5$, $Ta_2O_5$ and/or $Nb_2O_5$; and $Me^{VI}O_3$ is selected in particular from $WO_3$ and/or $MoO^3$.

Particularly preferably, the silicon dioxide glass-ceramic contains $SiO_2$, in particular low quartz, cristobalite or a mixture thereof, as main crystal phase.

Further preferred silicon dioxide glasses, silicon dioxide glasses with nuclei or silicon dioxide glass-ceramics are described in WO 2015/173394 A1.

The blank according to the second aspect preferably has monolithic layers of silicon dioxide glass, monolithic layers of silicon dioxide glass with nuclei or monolithic layers of silicon dioxide glass-ceramic.

According to a third aspect, it is preferred that the first and second layer of the blank according to the invention contain unsintered zirconium oxide or presintered zirconium oxide.

Particularly preferably, a blank according to the third aspect contains at least one and preferably all of the following components in the amounts indicated:

| | Unit | first layer | second layer |
|---|---|---|---|
| $ZrO_2 + HfO_2$ | wt.-g | 86.77-96.50 | 86.28-93.00 |
| $Y_2O_3$ | wt.-g | 3.5-8.0 | 7.0-10.0 |
| $Al_2O_3$ | wt.-% | 0.0-1.0 | 0.0-0.1 |
| $SiO_2$ | wt.-% | ≤0.02 | ≤0.02 |
| $Na_2O$ | wt.-% | ≤0.04 | ≤0.04 |
| $TiO_2$ | wt.-% | ≤0.10 | ≤0.10 |
| CaO | wt.-% | ≤0.10 | ≤0.10 |
| $Fe_2O_3$ | wt.-g | 0.001-0.200 | 0.002-0.100 |
| $Mn_2O_3$ | wt.-g | 0.000-0.001 | 0.000-0.001 |
| $Cr_2O_3$ | wt.-g | 0.00-0.01 | 0.000-0.005 |
| $Pr_2O_3$ | wt.-g | 0.000-0.003 | 0.00-0.002 |
| $Tb_2O_3$ | wt.-% | 0.00-0.02 | 0.000-0.015 |
| $Er_2O_3$ | wt.-% | 0.0-1.0 | 0.0-0.5 |
| CoO | wt.-% | 0.0-0.04 | 0.0-0.04 |
| NiO | wt.-% | ≤0.10 | ≤0.10 |
| $Yb_2O_3$ | wt.-% | ≤1.0 | ≤1.0 |
| $La_2O_3$ | wt.-% | ≤1.0 | ≤1.0 |
| MgO | wt.-% | ≤0.10 | ≤0.10 |
| further oxides | wt.-% | ≤0.50 | ≤0.50 |

The blanks according to the invention, including the blanks according to the invention of the first, second and third aspect, are preferably present in the form of blocks, cuboids, discs or cylinders, such as circular cylinders or cylinders with an elliptical base. In these forms, they can be further processed into the desired dental restorations particularly simply. Particularly preferably, the blanks according to the invention are present in the form of blocks.

In a further preferred embodiment, the blanks according to the invention have a holder for fixing in a processing device. The holder allows the fixing of the blanks in a processing device, such as in particular a milling or grinding device. The holder is usually in the form of a peg, and the holder preferably consists of metal or plastic.

The invention also relates to a process for the production of the blanks according to the invention.

The process for the production of the blank according to the invention according to the first aspect, i.e. a blank with layers, in particular monolithic layers, of lithium silicate glass, lithium silicate glass with nuclei or lithium metasilicate glass-ceramic, or the second aspect, i.e. a blank with layers, in particular monolithic layers of silicon dioxide glass, silicon dioxide glass with nuclei or silicon dioxide glass-ceramic, is characterized in that (a1) a first layer of lithium silicate glass, lithium silicate glass with nuclei, lithium metasilicate glass-ceramic, silicon dioxide glass, silicon dioxide glass with nuclei or silicon dioxide glass-ceramic with a viscosity of at least 6.6 Pa·s is provided in a mould, (b1) the surface of the first layer is shaped in order to provide the desired course of the boundary surface of the first and second layer of the blank, and (c1) a second layer of lithium silicate glass, lithium silicate glass with nuclei, lithium metasilicate glass-ceramic, silicon dioxide glass, silicon dioxide glass with nuclei or silicon dioxide glass-ceramic is applied to the surface of the first layer.

Particularly preferably, in step (a1) a first layer of a glass, in particular of lithium silicate glass or silicon dioxide glass, is provided in the mould.

The shaping of the surface of the first layer carried out in step (b1) can preferably be achieved by pressing with a structured counter die, e.g. a die made of graphite. Due to the relatively low strength of the glass preferably used in step (a1), in step (b1) a slight pressing power of e.g. less than 10 MPa is sufficient to achieve the desired shaping.

Furthermore, it is preferred that in step (c1) a second layer of a glass, in particular of lithium silicate glass or silicon dioxide glass, is applied to the shaped first layer. This application can be effected for example by means of casting of the glass.

It is further preferred that, between shaping of the boundary surface and coating with the material of the second layer, the blank is not subjected to any heat treatment for forming crystalline phases. Rather, it is preferred that, following step (c1), the complete blank is subjected to a heat treatment, e.g. for forming crystal phases, such as a lithium metasilicate glass-ceramic or a silicon dioxide glass-ceramic.

In an alternative process, a blank according to the first or second aspect can be produced by gradually filling starting materials in the form of powder into a pressing die.

The process for the production of the blank according to the invention according to the third aspect, i.e. a blank with layers of zirconium oxide, is characterized in that (a2) a first layer of unsintered or dispersed zirconium oxide is provided in a mould, (b2) the surface of the first layer is shaped in order to provide the desired course of the boundary surface of the first and second layer of the blank, and (c2) a second layer of unsintered or dispersed zirconium oxide is applied to the surface of the first layer.

The term "dispersed" refers to zirconium oxide which is homogeneously distributed in a suspension in a liquid medium, such as aqueous or organic solvent. The viscosity of the suspension is preferably so high that, after the shaping in step (b2), the shaped form of the surface is maintained.

Particularly preferably, following step (c2), the complete blank is subjected to a heat treatment in order to provide a presintered blank and thus to improve the processability and precision in the case of a subsequent machining for the production of dental restorations.

Due to their properties, the blanks according to the invention are particularly suitable for further processing into dental restorations.

The invention therefore also relates to a process for the production of dental restorations, in which (d1) a blank according to the first aspect of the invention is given the shape of the dental restoration by machining, (e1) at least one heat treatment is carried out in order to convert the lithium silicate glass, the lithium silicate glass with nuclei or the lithium metasilicate glass-ceramic into lithium disilicate glass-ceramic, and (f1) optionally the surface of the dental restoration obtained is finished or in an alternative embodiment (d2) a blank according to the second aspect of the invention is given the shape of the dental restoration by machining, (e2) optionally a heat treatment is carried out in order to convert the silicon dioxide glass or the silicon dioxide glass with nuclei into a silicon dioxide glass-ceramic or to increase the crystal content of a silicon dioxide glass-ceramic, and (f2) optionally the surface of the dental restoration obtained is finished or in an alternative embodiment (d3) a blank according to the third aspect of the invention is given the shape of the dental restoration by machining, (e3) at least one heat treatment is carried out in order to convert the unsintered or presintered zirconium oxide into densely sintered zirconium oxide, and (f3) optionally the surface of the dental restoration obtained is finished.

The dental restorations, shaped as desired, can be simply carved out of the blanks according to the invention by machining. According to the first aspect of the invention, in particular blanks with layers of lithium silicate glass with nuclei or lithium metasilicate glass-ceramic (step (d1)) or, according to the second aspect in particular blanks with layers of silicon dioxide glass-ceramic (step (d2)) or, according to the third aspect of the invention in particular blanks v layers of presintered zirconium oxide (step (d3)) are used for this.

The machining is usually effected by material-removing processes and in particular by milling and/or grinding. It is preferred that the machining is effected with computer-controlled milling and/or grinding devices. Particularly preferably, the machining is effected during a CAD/CAM process.

In step (e1) the blank is subjected to a heat treatment in order to bring about the controlled crystallization of lithium disilicate and thus the formation of lithium disilicate glass-ceramic. The heat treatment takes place in particular at a temperature of from 750 to 950° C. and preferably 800 to 900° C. The heat treatment is carried out in particular for a duration of from 1 to 30 min, preferably 2 to 15 min.

In step (e2) the blank is optionally subjected to a heat treatment. However, in the case of a blank based on silicon dioxide glass-ceramic it is preferred that no heat treatment according to (e2) is carried out. Such a process is particularly simple and cost-effective and therefore particularly preferred.

In step (e3) the blank is subjected to a heat treatment in order to bring about the formation of densely sintered zirconium oxide ceramic. The heat treatment takes place in particular at a temperature of from 1050 to 1600° C. and preferably 1450 to 1550° C. The heat treatment is carried out in particular for a duration of from 0 to 240 min, preferably 5 to 180 min, particularly preferably 30 to 120 min, wherein the term "duration" relates to the holding time of the maximum temperature.

After steps (e1) or (e2) or (e3) have been carried out, dental restorations are present with layers of lithium disilicate glass-ceramic, silicon dioxide glass-ceramic or zirconium oxide ceramic which have excellent mechanical properties and a high chemical stability. In addition, due to the multiple layers that differ in colour, they allow an excellent imitation of the optical properties of natural tooth material, e.g. of colour gradients from the dentine to the incisal edge. Finally, with the aid of steps (d1) to (f1) or (d2) to (f2), the restorations can also be produced from the blanks according to the invention without substantial shrinkage. This is due, in particular, to the fact that the blanks according to the invention according to the first and second aspect have monolithic layers and not discontinuous layers such as powder or granular-material layers, whereby a sintering after the shaping and an associated shrinkage can be dispensed with. By using the blanks according to the invention, dental restorations with precisely the desired dimensions can therefore be produced particularly simply. In the case of blanks according to the invention according to the third aspect, the problem of the sintering shrinkage occurring in step (e3) can be solved in that the first and the second layer have a substantially identical total shrinkage during step (e3). Such a setting of the total shrinkage can be effected in that the starting and final densities, before and after the heat treatment, are in each case identical in both layers. In particular, as regards the beginning of sintering, the each individual layers can be matched to other by their composition, in particular by means of addition of sintering activators and/or inhibitors. Due to the oblique course of the boundary surface of the first and the second layer, the fit of the dental restoration to be produced is determined in particular by the fit and thus by the sintering shrinkage of the first layer of the blank according to the invention, which imitates the dentine layer and is less strongly influenced by possible different sintering shrinkage behaviours in the individual layers, than would be the case with conventional blanks with a horizontal layer sequence.

The dental restorations produced according to the invention are preferably selected from crowns, abutments, abutment crowns, inlays, onlays, veneers, facets and bridges, as well as overstructures for multi-part restoration frameworks which can consist e.g. of oxide ceramic, metals or dental alloys.

In the optional steps (f1), (f2) and (f3), the surface of the dental restoration can still be finished. It is in particular still possible to carry out a glaze firing at a temperature of from 700 to 850° C. or to polish the restoration. In addition, a layering material made of glasses and/or glass-ceramics can also be applied.

Due to the particular properties of the blanks according to the invention described, these are in particular suitable for producing dental restorations. The invention therefore also relates to the use of the blanks for the production of dental restorations and in particular of crowns, abutments, abutment crowns, inlays, onlays, veneers, facets and bridges, as well as overstructures. The use of the blanks according to the invention for the production of a dental prosthesis in the anterior tooth region, such as of an anterior tooth crown, is particularly preferred.

The invention claimed is:

1. Blank for dental purposes which comprises a first and a second layer which, independently of each other, are based on
    glass,
    glass-ceramic or
    ceramic;
    wherein the first layer and the second layer differ in colour and form a boundary surface, wherein the boundary surface runs obliquely;
    wherein in a first sectional plane through the blank, which runs parallel to the insertion axis of the blank, the boundary surface has an angle of 10 to 70° to the rotation axis and wherein the angle between the insertion axis and the rotation axis of the blank in the first sectional plane is from 70 to 110°;
    wherein
    (i) the boundary surface in the first sectional plane runs substantially straight and the boundary surface in the first sectional plane is at an angle of from 20 to 80° to the insertion axis, or
    (ii) the boundary surface in the first sectional plane runs arcuately and the line of best fit through the arcuate boundary surface in the first sectional plane is at an angle of from 20 to 80° to the insertion axis.

2. Blank according to claim 1, in which in a first sectional plane through the blank, which runs parallel to the insertion axis of the blank, the boundary surface does not run perpendicular to the insertion axis.

3. Blank according to claim 1, in which the boundary surface runs arcuately through the blank in a second sectional plane which runs perpendicular to the first sectional plane, wherein the boundary surface runs convexly curved in the second sectional plane.

4. Blank according to claim 3, in which the boundary surface in the second sectional plane has a mamelon structure.

5. Blank according to claim 1, in which the first layer has a refractive index which differs from the refractive index of the second layer by not more than 0.1.

6. Blank according to claim 1, which comprises a mark which is recognized by a CAD/CAM device and with which the position of the boundary surface can be determined with an accuracy of 0.1 mm.

7. Blank according to claim 1, in which the glass, the glass-ceramic or the ceramic are selected from lithium silicate glass, lithium silicate glass-ceramic, silicon dioxide glass, silicon dioxide glass-ceramic and/or zirconium oxide.

8. Blank according to claim 7, in which the first and second layer, independently of each other, are based on
    lithium silicate glass,
    lithium silicate glass with nuclei or
    lithium metasilicate glass-ceramic,
    wherein the lithium silicate glass, the lithium silicate glass with nuclei or the lithium metasilicate glass-ceramic comprise at least one of the following components in the amounts indicated:

| Component | wt.-% |
| --- | --- |
| $SiO_2$ | 64.0 to 73.0 |
| $Li_2O$ | 12.0 to 18.0 |
| $K_2O$ | 1.0 to 5.0 |
| $Al_2O_3$ | 0.5 to 5.0 |
| $P_2O_5$ | 1.0 to 7.0. |

9. Blank according to claim 8, in which the amount of oxides of elements with an atomic number of 19 or higher in the first layer differs by not more than 2 wt.-% from the amount of oxides of elements with an atomic number of 19 or higher in the second layer.

10. Blank according to claim 7, in which the first and second layer, independently of each other, are based on
    silicon dioxide glass,
    silicon dioxide glass with nuclei or
    silicon dioxide glass-ceramic,
    wherein the silicon dioxide glass, the silicon dioxide glass with nuclei or the silicon dioxide glass-ceramic comprise at least one of the following components in the amounts indicated:

| Component | wt.-% |
| --- | --- |
| $SiO_2$ | 58.0 to 92.0 |
| $Li_2O$ | 2.0 to 10.0 |
| $Me^{I}_2O$ | 0 to 13.0 |
| $Me^{II}O$ | 0 to 11.0 |
| $Me^{III}_2O_3$ | 0 to 10.0 |
| $Me^{IV}O_2$ | 0 to 21.0 |
| $P_2O_5$ | 0 to 7.0 |
| $Me^{V}_2O_5$ | 0 to 6.0 |
| $Me^{VI}O_3$ | 0 to 6.0 |
| Fluorine | 0 to 5.0, | wherein $Me^{I}_2O$ is selected from $Na_2O$, $K_2O$, $Rb_2O$ and/or $Cs_2O$;
$Me^{II}O$ is selected from MgO, Cao, Sro and/or Zno;
$Me^{III}_2O_3$ is selected from $Al_2O_3$, $B_2O_3$, $Y_2O_3$, $La_2O_3$, $Ga_2O_3$ and/or $In_2O_3$;
$Me^{IV}O_2$ is selected from $ZrO_2$, $GeO_2$, $CeO_2$, $TiO_2$ and/or $SnO_2$;
$Me^{V}_2O_5$ is selected from $V_2O_5$, $Ta_2O_5$ and/or $Nb_2O_5$; and
$Me^{VI}O_3$ is selected from $WO_3$ and/or $MoO_3$.

11. Blank according to claim 7, in which the first and second layer, independently of each other, comprise
    unsintered zirconium oxide or
    presintered zirconium oxide.

12. Process for the production of a blank according to claim 1, in which
    (a) a first layer based on glass, glass-ceramic or ceramic is provided,
    (b) the surface of the first layer is shaped in order to provide the desired course of the boundary surface of the first and second layer of the blank, and
    (c) a second layer based on glass, glass-ceramic or ceramic is applied to the surface of the first layer.

13. Process for the production of a blank according to claim 7 with layers of lithium silicate glass, lithium silicate glass with nuclei, lithium metasilicate glass-ceramic, silicon dioxide glass, silicon dioxide glass with nuclei or silicon dioxide glass-ceramic, in which
    (a1) a first layer of lithium silicate glass, lithium silicate glass with nuclei, lithium metasilicate glass-ceramic, silicon dioxide glass, silicon dioxide glass with nuclei or silicon dioxide glass-ceramic with a viscosity of at least 6.6 Pa·s is provided in a mould,
(b1) the surface of the first layer is shaped in order to provide the desired course of the boundary surface of the first and second layer of the blank, and
(c1) a second layer of lithium silicate glass, lithium silicate glass with nuclei, lithium metasilicate glass-ceramic, silicon dioxide glass, silicon dioxide glass with nuclei or silicon dioxide glass-ceramic is applied to the surface of the first layer.

14. Process for the production of a blank with layers of zirconium oxide according to claim 11, in which
(a2) a first layer of unsintered or dispersed zirconium oxide is provided in a mould,
(b2) the surface of the first layer is shaped in order to provide the desired course of the boundary surface of the first and second layer of the blank, and
(c2) a second layer of unsintered or dispersed zirconium oxide is applied to the surface of the first layer.

15. Process for the production of a dental restoration, in which
(d) a blank according to claim 1 is given the shape of the dental restoration by machining,
(e) optionally at least one heat treatment is carried out, and
(f) optionally the surface of the dental restoration obtained is finished.

16. Process according to claim 15, in which the dental restoration is selected from the group of crowns, abutments, abutment crowns, inlays, onlays, veneers, facets, bridges and overstructures.

* * * * *